US009684803B2

(12) United States Patent
Cohen et al.

(10) Patent No.: US 9,684,803 B2
(45) Date of Patent: *Jun. 20, 2017

(54) PROTECTING CONTENT DISPLAYED ON A MOBILE DEVICE

(71) Applicant: International Business Machines Corporation, Armonk, NY (US)

(72) Inventors: Guy M. Cohen, Ossining, NY (US); Lior Horesh, North Salem, NY (US); Raya Horesh, North Salem, NY (US); Marco Pistoia, Amawalk, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,598

(22) Filed: Jul. 20, 2016

(65) Prior Publication Data
US 2016/0358014 A1    Dec. 8, 2016

Related U.S. Application Data

(63) Continuation of application No. 14/599,778, filed on Jan. 19, 2015, now Pat. No. 9,443,102.

(51) Int. Cl.
*G06F 21/84* (2013.01)
*G06F 21/62* (2013.01)
(Continued)

(52) U.S. Cl.
CPC .............. *G06F 21/84* (2013.01); *G06F 21/10* (2013.01); *G06F 21/32* (2013.01); *G06F 21/60* (2013.01);
(Continued)

(58) Field of Classification Search
CPC . H04W 52/0254; G06F 21/84; G06F 21/6245
See application file for complete search history.

(56) References Cited

U.S. PATENT DOCUMENTS 6,317,834 B1    11/2001    Gennaro et al.
6,407,724 B2    6/2002    Waldern et al.
(Continued)

FOREIGN PATENT DOCUMENTS

GB    2455061 A    6/2009
GB    2476027 A    6/2011
WO    2013060826 A1    5/2013

OTHER PUBLICATIONS http://solutions.3m.com/wps/portal/3M/en_US/SDP$_{13}$ NaturalView/screenprotector/cell-screen-protector/mobile-privacy-film/, 3M Privacy Screen Protector for Smart Phones, accessed: Nov. 7, 2014.
(Continued)

*Primary Examiner* — Dao Ho
(74) *Attorney, Agent, or Firm* — L. Jeffrey Kelly; Douglas M. Crockatt; Daniel P. Morris

(57) ABSTRACT

A method of protecting content displayed on a mobile device screen is provided. The mobile device screen may receive both sensitive and non-sensitive content. An image of one or more authorized users viewing the mobile device screen is detected, whereby, based on the detected image of the one or more authorized users, the received content is generated on the mobile device screen using a plurality of pixels. The plurality of pixels have both first sub-pixel units that include a first viewing angle and second sub-pixel units that include a second viewing angle. The first sub-pixel units generate an image of the non-sensitive content on the mobile device screen at the first viewing angle and the second sub-pixel units generate an image of the sensitive content at the second viewing angle, such that, the second viewing angle is smaller relative to the first viewing angle for obscuring the sensitive content.

17 Claims, 8 Drawing Sheets

(51) Int. Cl.

| | | |
|---|---|---|
| *G06K 9/00* | (2006.01) | |
| *G09G 3/36* | (2006.01) | |
| *H04W 52/02* | (2009.01) | |
| *G06T 3/00* | (2006.01) | |
| *H04N 7/18* | (2006.01) | |
| *G06K 9/22* | (2006.01) | |
| *G09G 3/20* | (2006.01) | |
| *G09G 3/32* | (2016.01) | |
| *G06F 21/32* | (2013.01) | |
| *G06F 21/60* | (2013.01) | |
| *G06F 21/10* | (2013.01) | |
| *G09G 5/14* | (2006.01) | |
| *G06F 3/01* | (2006.01) | |

(52) U.S. Cl.
CPC ..... *G06F 21/6245* (2013.01); *G06K 9/00255* (2013.01); *G06K 9/00288* (2013.01); *G06K 9/228* (2013.01); *G06T 3/0093* (2013.01); *G09G 3/2003* (2013.01); *G09G 3/32* (2013.01); *G09G 3/36* (2013.01); *G09G 5/14* (2013.01); *H04N 7/18* (2013.01); *H04W 52/0254* (2013.01); *G06F 3/013* (2013.01); *G06F 2221/032* (2013.01); *G09G 2320/068* (2013.01); *G09G 2354/00* (2013.01); *G09G 2358/00* (2013.01)

(56) References Cited

U.S. PATENT DOCUMENTS

| | | |
|---|---|---|
| 6,456,262 B1 | 9/2002 | Bell |
| 7,130,454 B1 | 10/2006 | Berube et al. |
| 8,141,159 B2 | 3/2012 | Peled et al. |
| 8,427,746 B2 | 4/2013 | Si |
| 8,462,949 B2 | 6/2013 | Anderson et al. |
| 8,550,628 B2 | 10/2013 | Durnell et al. |
| 8,629,821 B2 | 1/2014 | Borgers et al. |
| 9,105,298 B2 | 8/2015 | Grim, III et al. |
| 2006/0069692 A1 | 3/2006 | Pernia |
| 2009/0273562 A1 | 11/2009 | Baliga et al. |
| 2009/0307601 A1 | 12/2009 | Kumhyr et al. |
| 2010/0100623 A1 | 4/2010 | Wulff et al. |
| 2014/0013437 A1 | 1/2014 | Anderson et al. |
| 2014/0047560 A1 | 2/2014 | Meyer et al. |
| 2014/0197922 A1 | 7/2014 | Stanwood et al. |
| 2015/0348321 A1 | 12/2015 | Rossini |

OTHER PUBLICATIONS

McManamon et al. "Optical Phased Array Technology", Proceedings of the IEEE, vol. 84, No. 2, Feb. 1996, pages 268-298.

Shi. "LCD Design for Optical Phased Array: Chip Scale Technologies for Laser Communication, Infrared countermeasure and Telescope Imaging"—Jianru Shi, (May 6, 2009), ISBN-10: 3639151380.

Cohen et al.; U.S. Appl. No. 15/241,801, filed Aug. 19, 2016; Entitled "Protecting Content Displayed on a Mobile Device".

List of IBM Patents or Patent Applications Treated As Related; Dated Aug. 22, 2016; 2 pages.

Cohen et al.; U.S. Appl. No. 14/599,778, filed Jan. 19, 2015; Entitled "Protecting Content Displayed on a Mobile Device".

Cohen et al.; U.S. Appl. No. 15/214,712, filed Jul. 20, 2016; Entitled "Protecting Content Displayed on a Mobile Device".

List of IBM Patents or Patent Applications Treated as Related; Dated Jul. 20, 2016; 2 pages.

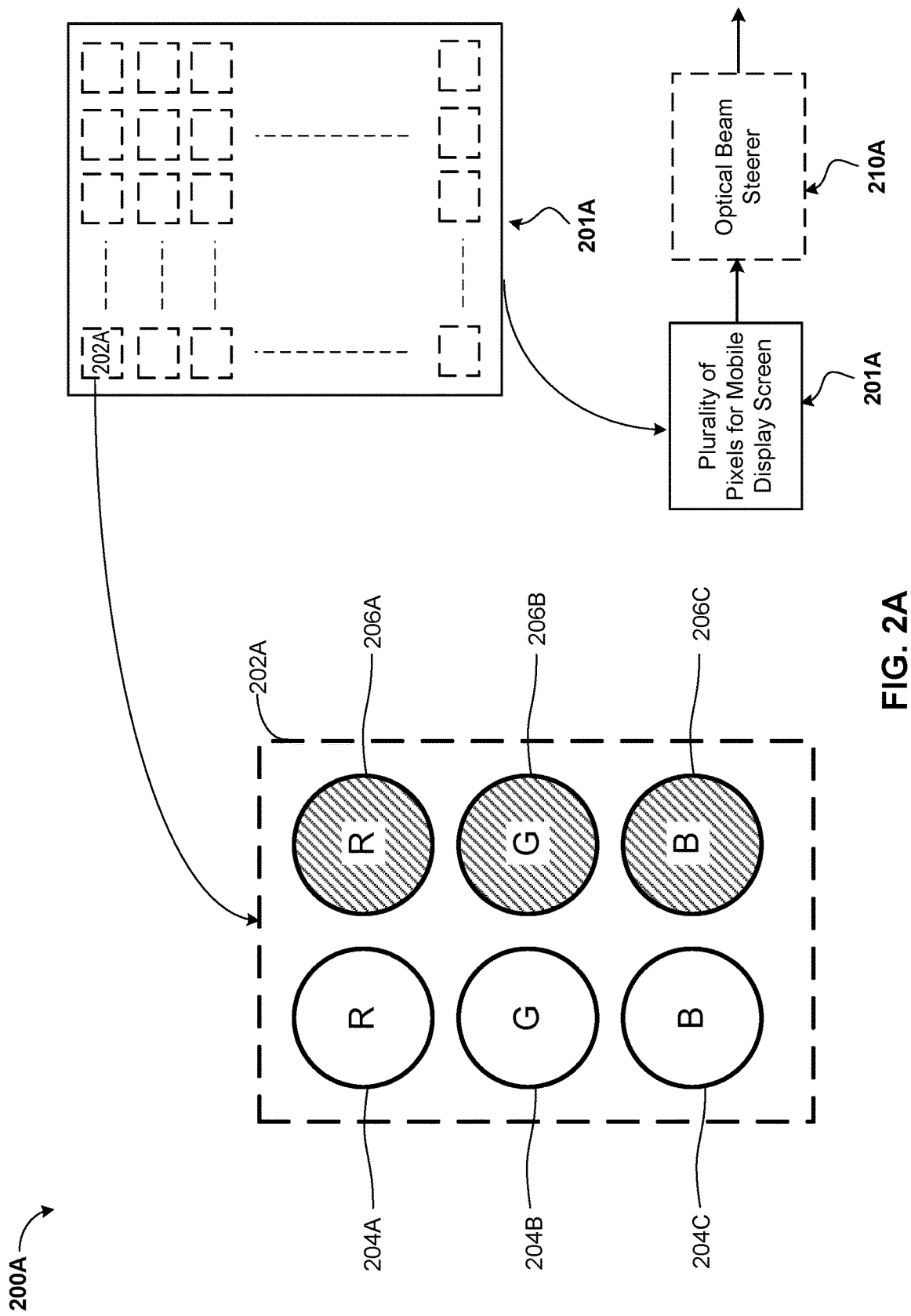

PROTECTING CONTENT DISPLAYED ON A MOBILE DEVICE

BACKGROUND

The present invention generally relates to mobile devices, and more particularly, to protecting sensitive content displayed on mobile devices.

Many of today's software applications may operate on multiple mobile devices, especially since an individual user can execute them on different platforms (Android, Apple, Windows, Blackberry, etc.). When these applications execute, confidential/sensitive information may be accordingly transferred between mobile devices. Such confidential/sensitive information may, however, be required to be viewed by a specific individual(s) only. Unauthorized viewers nearby may therefore be able to gain access to this confidential/sensitive information displayed on the mobile device. This risk of the unauthorized viewing of confidential/sensitive information on mobile devices is becoming ever more prevalent due to the mass proliferation and utilization of these devices.

BRIEF SUMMARY

According to one embodiment, a system for protecting content includes a mobile device screen including a plurality of pixels, where each of the plurality of pixels have both first sub-pixel units that include a first viewing angle and second sub-pixel units that include a second viewing angle. Within each of the plurality of pixels, the first sub-pixel units are adjacent to the one of the second sub-pixel units. A processing unit is coupled to the mobile device screen such that the processing unit determines at least a portion of the mobile device screen that displays sensitive content. The processing unit obscures the sensitive content displayed on the at least a portion of the mobile device screen by deactivating the first sub-pixel units including the first viewing angle at the portion of the mobile device screen that displays the sensitive content and activates the second sub-pixel units including the second viewing angle at the portion of the mobile device screen that displays the sensitive content.

According to another exemplary embodiment, a method of protecting content displayed on a mobile device screen is provided. The method includes receiving content to be displayed on the mobile device screen, where the received content contains sensitive content and non-sensitive content. An image of one or more authorized users viewing the mobile device screen is detected, whereby, based on the detected image of the one or more authorized users, an image of the received content is generated on the mobile device screen using a plurality of pixels. The plurality of pixels each have both first sub-pixel units that include a first viewing angle and second sub-pixel units that include a second viewing angle. The first sub-pixel units generate an image of the non-sensitive content on the mobile device screen at the first viewing angle and the second sub-pixel units generate an image of the sensitive content on the mobile device screen at the second viewing angle, such that, the second viewing angle has a smaller viewing angle relative to the first viewing angle for obscuring the sensitive content.

According to yet another exemplary embodiment, a computer program product for protecting content displayed on a mobile device is provided. The computer program product includes a computer readable storage medium that is readable by a processing circuit and stores instructions for execution by the processing circuit for performing a method. The method includes instructions for receiving content to be displayed on the mobile device screen, where the received content contains sensitive content and non-sensitive content. An image of one or more authorized users viewing the mobile device screen is detected, whereby, based on the detected image of the one or more authorized users, an image of the received content is generated on the mobile device screen using a plurality of pixels. The plurality of pixels each have both first sub-pixel units that include a first viewing angle and second sub-pixel units that include a second viewing angle. The first sub-pixel units generate an image of the non-sensitive content on the mobile device screen at the first viewing angle and the second sub-pixel units generate an image of the sensitive content on the mobile device screen at the second viewing angle. An image of one or more unauthorized users viewing the mobile device screen may be detected, whereby, based on the detected one or more unauthorized users, a blank or any other non-sensitive image on the mobile device screen is generated.

The method may include instructions to generate an image on the mobile screen using a plurality of pixels, where the plurality of pixels each have both first sub-pixel units that include a first viewing angle and second sub-pixel units that include a second viewing angle. At least a portion of the image contains sensitive content. The method also includes instructions to detect one or more unauthorized users viewing the displayed image. The method further includes instructions to obscure the sensitive content from the one or more detected unauthorized users by deactivating the first sub-pixel units including the first viewing angle at the portion of the mobile device screen that displays the sensitive content and activating the second sub-pixel units including the second viewing angle at the portion of the mobile device screen that displays the sensitive content.

According to yet another exemplary embodiment, a system for protecting content that includes a mobile device screen is provided, whereby the screen includes a plurality of pixels each having both first sub-pixel units that emit visible light and second sub-pixel units that emit infrared (IR) light. Within each of the plurality of pixels the first sub-pixel units are adjacent to the second sub-pixel units. A processing unit is coupled to the mobile device screen, whereby the processing unit determines at least a portion of the mobile device screen that displays sensitive content. The processing unit obscures the sensitive content displayed on the at least a portion of the mobile device screen by activating the second sub-pixel units at the portion of the mobile device screen that displays the sensitive content.

BRIEF DESCRIPTION OF THE SEVERAL VIEWS OF THE DRAWINGS

FIGS. 2A and 2B show a pixel structure associated with the mobile device screen that protects against the viewing of sensitive or confidential content, according to one embodiment;

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The one or more exemplary embodiments described herein may be directed to a system, method, and apparatus that may include, among other things, a display system involving an adaptive beam steering mechanism (e.g. controlled collimators or optical phased array), that allows the directing (focusing) of visual information towards a specific spatial position associated with an authorized viewer or user. For example, according to one embodiment, a closed loop control system using a mobile device's camera(s) may track the eyes (or other facial feature) of an authorized individual and direct the visual content from the mobile device display in such a manner that only make the content visible at the location of the authorized individual's eyes (or other facial features). Thus, no replicas may be taken by another camera that is located away from the geometric position of the authorized individual's eyes. According to another embodiment, the divergence angle of the displayed content is varied according to whether sensitive content is being displayed. Accordingly, portions of the screen displaying the sensitive content include a narrower viewing angle, while the non-sensitive content remains displayed with a wider viewer, as provided by the standard display characteristics of the mobile device. An authentication process may, in some embodiments, exclusively enable the projection of sensitive information based on the identification of the authorized individual(s) and accordingly no content replication threat.

Further embodiments may include a time-based mechanism that enforces the rule that the sensitive information can only be available for a controlled period of time (e.g., 5 minutes, etc.).

Sensitive or confidential content/information is used synonymously to include any information or content that is either legally confidential or identified by a user (i.e., an authorized user) as being only for the eyes of the user themselves, or any one or more other persons authorized by this user. For example, a user may wish to obscure their financial information displayed on their mobile device while seated in a plane. Similarly, an organization may wish to obscure some or all of their corporate information displayed on the mobile devices of their employees.

Figure 1:
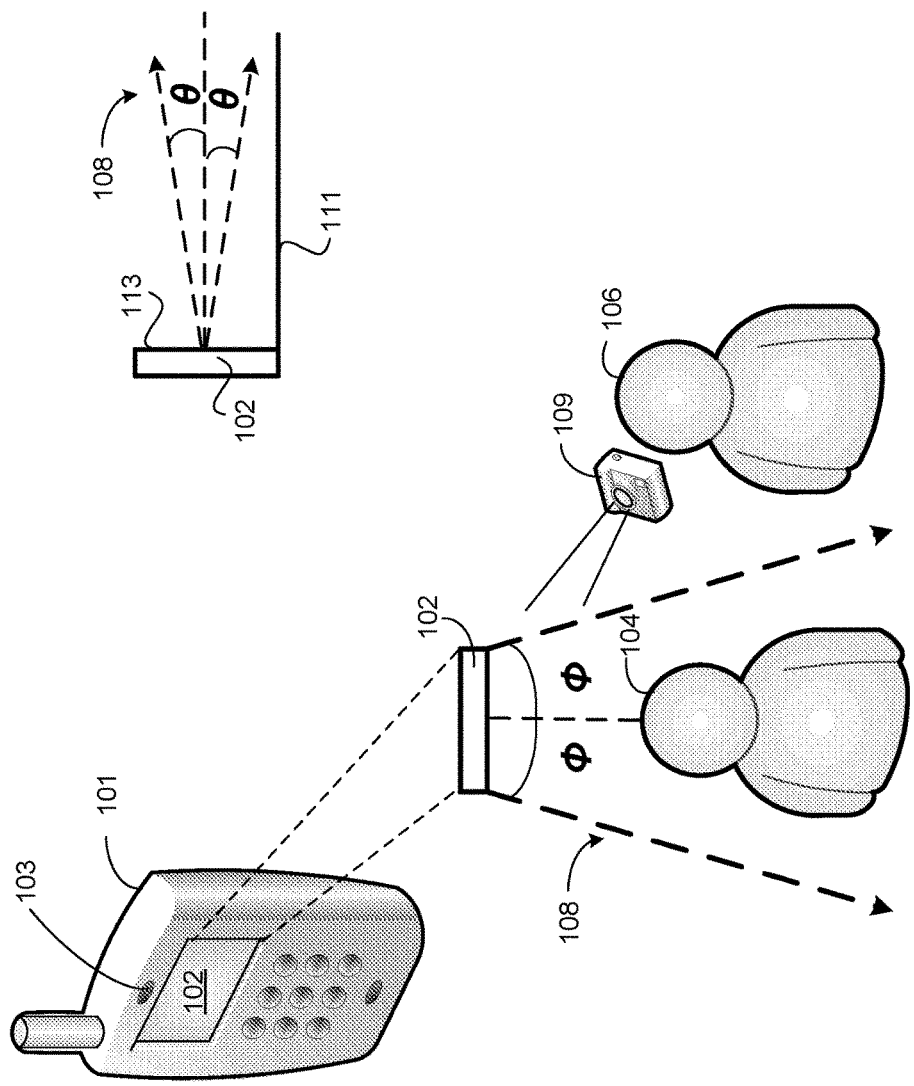
FIG. 1 shows a mobile device screen content protection concept based on viewing angle, according to one embodiment.

FIG. 1 shows a mobile device screen content protection concept based on viewing angle, according to one embodiment. FIG. 1 may depict, among other things, a mobile device 101 with a screen 102, one or more authorized viewers or users 104, and one or more unauthorized viewers or users 106. Mobile device screen 102 may have a viewing angle $\Phi$ that defines a viewing region 108 (i.e., a cone of viewing). Viewing angle $\Phi$ may have, among other things, an angle of inclination $\theta$ of approximately ten degrees with respect to a surface 111 normal to the mobile device screen 102. An unauthorized user 106 may be attempting to view mobile device screen 102 from a viewing angle greater than the viewing angle $\Phi$, and may, therefore, be considered to be outside of viewing region 108. Consequently, unauthorized user 106 may be unable to view the content displayed on mobile device screen 102.

FIG. 2A shows a pixel structure 200A associated with a mobile device screen that protects against the viewing of sensitive or confidential content, according to one embodiment. Pixel structure 200A may accordingly include a plurality of pixels for a mobile device screen 201A having one or more pixels 202A, and an optional optical beam steerer 210A for directionally controlling the illumination direction of the displayed image output from the mobile device screen 102 (FIG. 1). The one or more pixels 202A each include respective red, green, and blue sub-pixel units 204A, 204B, and 204C having a first viewing angle, and respective red, green, and blue sub-pixel units 206A, 206B, and 206C having a second viewing angle. The second viewing angle may be generated to be narrower than the first viewing angle by using one or more optical collimators implemented using, for example, one or more optical lenses (see FIGS. 3A & 3B). In some implementations, a beam steerer 210A may be optionally utilized to spatially alter the direction of the pixel illumination output from respective red, green, and blue sub-pixel units 206A, 206B, and 206C.

Alternatively, the viewing angle of sub-pixel units 204A-204C and the viewing angle of sub-pixel units 206A-206C may be substantially the same or similar. The one or more optical collimators implemented using, for example, one or more optical lenses (see FIGS. 3A & 3B) may then be used to decrease the viewing angle of both sub-pixel units 204A-204C and 206A-206C. Optional beam steerer 210A may be further utilized to accordingly direct the sensitive or confidential content towards, for example, the eyes of an authorized user 104 (FIG. 1).

In operation, content may be displayed on the one or more pixels 202A using the sub-pixel units 204A-204C and, optionally, sub-pixel units 206A-206C. Upon detecting an unauthorized viewer, at the pixel locations displaying sensitive content, the wider viewing angle sub-pixel units 204A-204C displaying the content may be deactivated, while the adjacent narrower viewing angle sub-pixel units 206A-206C are activated. Thus, the use of sub-pixel units 206A-206C to display sensitive content may decrease the viewing angle with respect to the mobile device screen 102 (FIG. 1), which may prevent unauthorized users from attempting to view the content displayed on the mobile device from, for example, "over the shoulder" of an authorized viewer.

Figure 2B:
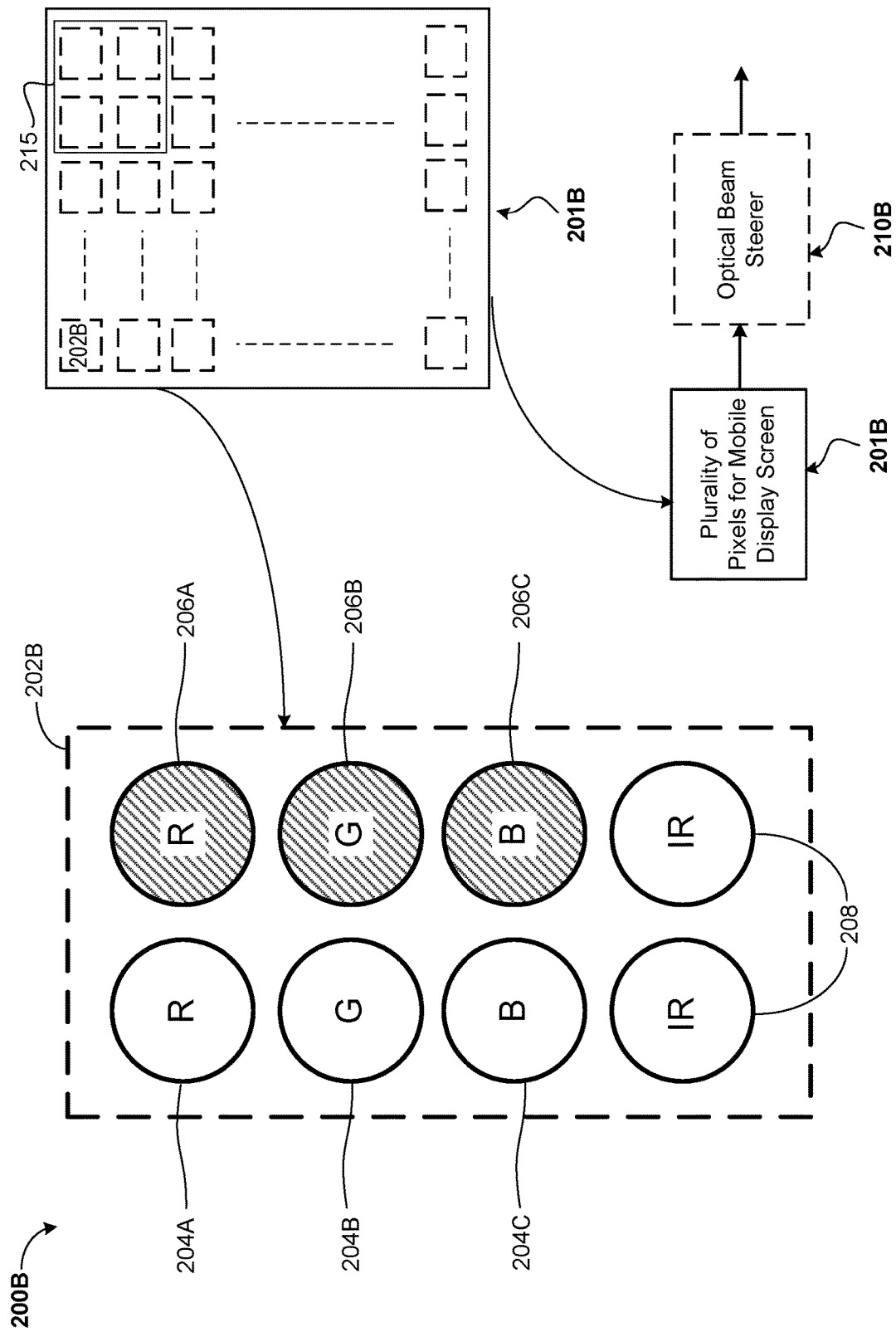

FIG. 2B shows an alternative pixel structure 200B associated with a mobile device screen that protects against the viewing of sensitive or confidential content, according to one embodiment. Pixel structure 200B may accordingly include a plurality of pixels for a mobile device screen 201B having one or more pixels 202B, and an optional optical beam steerer 210B for directionally controlling the illumination direction of the displayed image output from the mobile device screen. The one or more pixels 202B may include respective red, green, and blue sub-pixel units 204A, 204B, and 204C having a first viewing angle; respective red, green, and blue sub-pixel units 206A, 206B, and 206C having a second viewing angle; and one or more infrared (IR) sub-pixel units 208 associated with each pixel 202B. The second viewing angle may be generated to be narrower than the first viewing angle by using one or more optical collimators implemented using, for example, one or more optical lenses (see FIGS. 3A & 3B). In some implementations, a beam steerer 210B may be optionally utilized to spatially alter the direction of the pixel illumination output from respective red, green, and blue sub-pixel units 206A, 206B, and 206C. The one or more IR sub-pixel units may be, for example, an IR light-emitting diode or other source of infrared light.

Although one or more infrared (IR) sub-pixel units 208 are associated with each pixel 202B, in alternative implementations, one IR pixel per N-group of pixels may be utilized. For example, one of the sub-pixel units 208 may be placed for every group of four (i.e., N=4) pixels, as indicted by group 215. Thus, fewer infrared (IR) sub-pixel units 208 within the plurality of pixels 202B forming mobile device screen 201B may be used, so long as, the emitted IR light from each one of the IR sub-pixel units 208 substantially overlaps the visible light generated by the red, green, blue sub-pixel units 206A, 206B, 206C associated with the pixels 202B within its respective group. In the given example, each IR sub-pixel unit 208 emission substantially overlaps the visible light generated by the red, green, and blue sub-pixel units 206A, 206B, 206C of each of the four pixels 202B within group 215.

It may be appreciated that IR light sources may alternatively be embedded within the periphery of the mobile device screen so as to not adversely affect the resolution of the mobile device screen. In contrast to activating all the IR light sources within the periphery of the mobile device screen, exhibiting control over IR sub-pixel units on a per pixel basis at pixel locations on the screen 201B where sensitive or confidential content is display, reduces battery power consumption. Instead of activating all the IR emitter devices, such as in the display periphery approach, only those IR sub-pixel units used to obfuscate sensitive or confidential content from an external camera may be activated.

In operation, non-sensitive content may be displayed on the one or more pixels 202B using the sub-pixel units 204A-204C. Upon detecting an unauthorized viewer, at the pixel locations displaying sensitive content, the wider viewing angle sub-pixel units 204A-204C displaying the content may be deactivated, while the adjacent narrower viewing angle sub-pixel units 206A-206C are activated. Thus, the use of sub-pixel units 206A-206C to display sensitive content may decrease the viewing angle with respect to the mobile device screen 102 (FIG. 1), which may prevent unauthorized users from attempting to view the content displayed on the mobile device from, for example, "over the shoulder" of an authorized viewer.

Additionally, the one or more IR sub-pixel units 208 may activate upon detection of an external camera 109 (FIG. 1) by the mobile device 101 (FIG. 1) and generate IR light. The IR light may accordingly be used to saturate an image sensor (e.g., CMOS or CCD sensor) of the external camera 109 to the mobile device 101 in order to prevent the external camera 109 from recording or capturing sensitive content displayed on the screen of the mobile device 101. As previously described, the viewing angle of sub-pixel units 204A-204C and the viewing angle of sub-pixel units 206A-206C may, alternatively, be substantially the same or similar. In some implementations, the IR light source (e.g., IR sub-pixel units 208) may be turned on every time sensitive or confidential information is displayed. This may be done for mobile devices that do not have a camera or a method to identify the person watching the display. Furthermore, the IR light source may be turned on as a measure to ensure that the content of the display is not copied even by the authorized user (i.e. a user authorized to only view the information but not to make a copy of the information).

Alternatively, the viewing angle of sub-pixel units 204A-204C and the viewing angle of sub-pixel units 206A-206C may be substantially the same or similar. The one or more optical collimators implemented using, for example, one or more optical lenses (see FIGS. 3A & 3B) may then be used to decrease the viewing angle of both sub-pixel units 204A-204C and 206A-206C. Optional beam steerer 210B may be further utilized to accordingly direct the sensitive or confidential content towards, for example, the eyes of an authorized user 104 (FIG. 1).

Still referring to FIG. 2B, each of the pixels 202B may include only the sub-pixel units 204A-204C that have a conventional (i.e., wider) viewing angle and one or more IR sub-pixel units 208. In such a display screen configuration, narrower viewing angle sub-pixel units such as sub-pixel units 206A-206C are omitted.

Figure 3A:
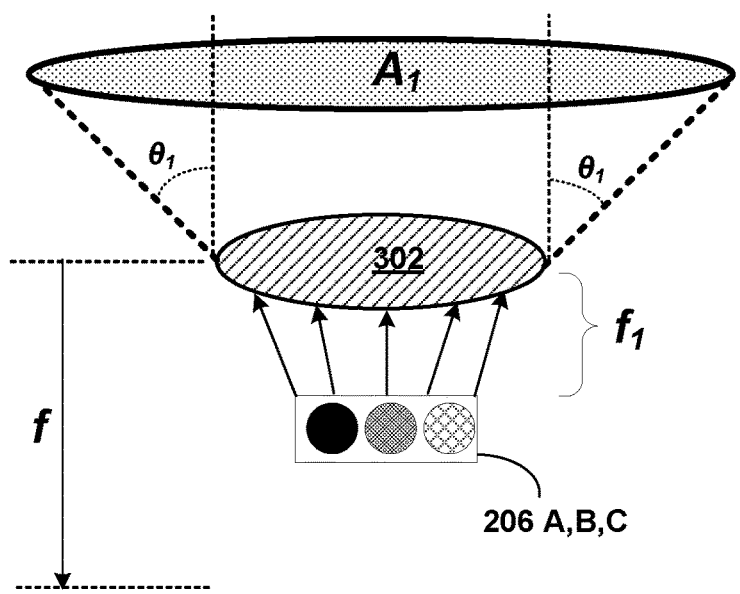
FIG. 3A depicts a wider viewing angle generated by a wide-angle sub-pixel unit at each pixel position of the mobile device screen, according to one embodiment.
Figure 3B:
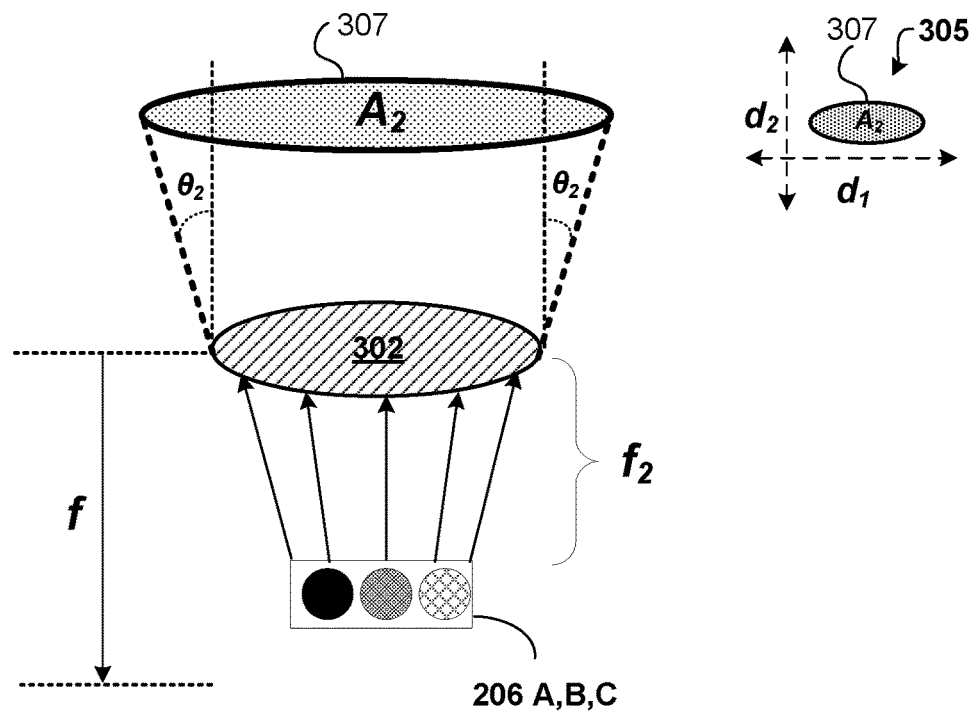
FIG. 3B depicts a narrower viewing angle generated by a narrow-angle sub-pixel unit at each pixel position of the mobile device screen, according to one embodiment.

Referring to FIGS. 3A-3B, exemplary views of a controlled collimator for changing the viewing angle of one or more sub-pixel units 206A-206C within the pixel structures of FIGS. 2A-2B are depicted. In FIG. 3A, a lens 302 may be placed a distance of length $f_1$ on top of sub-pixel units 206A-206C. Light that is generated by sub-pixel units 206A-206C and transmitted through lens 302 may accordingly have a viewing area of size $A_1$. In FIG. 3B, the distance between lens 302 and the sub-pixel units 206A-206C is increased to a length $f_2$. Consequently, at $f_2$, the light that is generated by sub-pixel units 206A-206C and transmitted through lens 302 may have a decreased viewing area of size of $A_2$, which may subsequently decrease the viewing angle of sub-pixel units 206A-206C. It may be appreciated that the distance between lens 302 and sub-pixels 206A-206C may be changed using, for example, a microelectromechanical system (MEMS). Additionally, further increases in the distance between lens 302 and sub-pixel units 206A-206C may lead to a further decrease in the viewing area and, therefore, viewing angle. Distances $f_1$ and $f_2$ may vary in relation to the focal length f of the lens 302. For example, at a distance equal to the focal length f, the lens 302 will generate a collimated output from the illumination produced by the sub-pixel units 206A-206C. At distance $f_1$, the position of the lens 302 relative to the sub-pixel units 206A-206C is less than the focal length f and, thus, the lens generates an output that has a divergence angle of $\theta_1$. At $f_2$, the distance of the lens 302 relative to the sub-pixel units 206A-206C is increased relative to $f_1$ but still remains less than the focal length f. Therefore, the divergence angle of the output of lens 302 reduces to $\theta_2$ relative to $\theta_1$. Thus, by manipulating the lens 302 or a system of lenses, the divergence angle and field of view may be changed. For example, in some implementations, the extent by which the divergence angle changes may be controllably varied based on the level of sensitivity or confidentiality of the content to be displayed. Accordingly, the more sensitive the content, the smaller the divergence angle and field of view created by the lens 302.

In some implementations, a film may be embedded within the display such that different viewing angles may be activated by applying a potential (e.g., voltage) in order to vary the optical characteristics of the film. For example, the refractive index of the film may be increased to limit light at glancing angles to escape the display. Increasing the refractive index of the film changes the critical angle (i.e., the angle at which light is totally internally reflected as dictated by Snell's Law). For example, by applying a first voltage to a film embedded within the screen 102 (FIG. 1), the film will exhibit a first refractive index ($n_1$) that reflects the visible light output from the pixels 202B (FIG. 2B) according to first angular relationship that generates a viewing area of size $A_1$ (FIG. 3A). Alternatively, by applying a second voltage to the film embedded within the screen 102 (FIG. 1), the film will exhibit a second refractive index ($n_2$) that reflects the visible light output from the pixels 202B (FIG. 2B) according to second angular relationship that generates a viewing area of size $A_2$ (FIG. 3B). Thus, varying the potential to the film generates different viewing angles based on the sensitivity of the content to be display.

Pixel positions of an authorized user viewing the mobile device screen are determined using the captured camera image (e.g., using facial recognition techniques). In operation, mobile device 101 (FIG. 1) may use the images generated by camera 103 (FIG. 1) to determine the location of authorized user 104 (FIG. 1) with respect to the surface 113 (FIG. 1) of mobile device screen 102 (FIG. 1). Mobile device 101 may then use this position to determine an angle by which beam steerer 210B (FIG. 2B) may divert the light output of sub-pixel units 206A-206C (FIG. 2B) towards the authorized user 104 (FIG. 1), contingent upon no unauthorized users being within the field of view of the camera 103 (FIG. 1). The beam steering may be implemented optionally, in particular, during instances when the user is moving relative to the display screen 102 of the mobile device 101. The beam steering feature may play yet a more significant role when the activated narrow-angle sub-pixel units 206A-206C (FIG. 2B) generate narrow fields of view 108 (FIG. 1) capable of being viewed over a relatively narrow angular range $\theta$, $\Phi$ (FIG. 1). It may be appreciated that many different phased array optical beam steering technical may be utilized. Non-limiting examples of phased array optical beam steering may include a blazed transmission grating used for beam steering, liquid crystal steering, liquid crystal polarization grating steering, lenslet array-based beam steering, MEMS-mirrors beam steering, vertical continuous optical phased arrays (V-COPA) beam steering, etc.

The output from the narrow-angle pixel subgroups located at the identified pixel positions associated with the portions of the screen that will display the sensitive or confidential content are optionally diverted to the authorized user viewing the screen. In operation, beam steerer 210B (FIG. 2B) may direct the output from sub-pixel units 206A-206C (FIG. 2B) such that the sensitive or confidential content displayed on mobile device screen 102 (FIG. 1) is diverted towards the authorized user 104 (FIG. 1). For example, referring to front view 305 in FIG. 3B, the output 307 from narrow-angle sub-pixel units 206A-206C, which display sensitive/confidential content, may be optionally steered to the authorized user 104 (FIG. 1) viewing the mobile device screen 102 (FIG. 1) along both a horizontal direction $d_1$ and a vertical direction $d_2$.

Figure 4A:
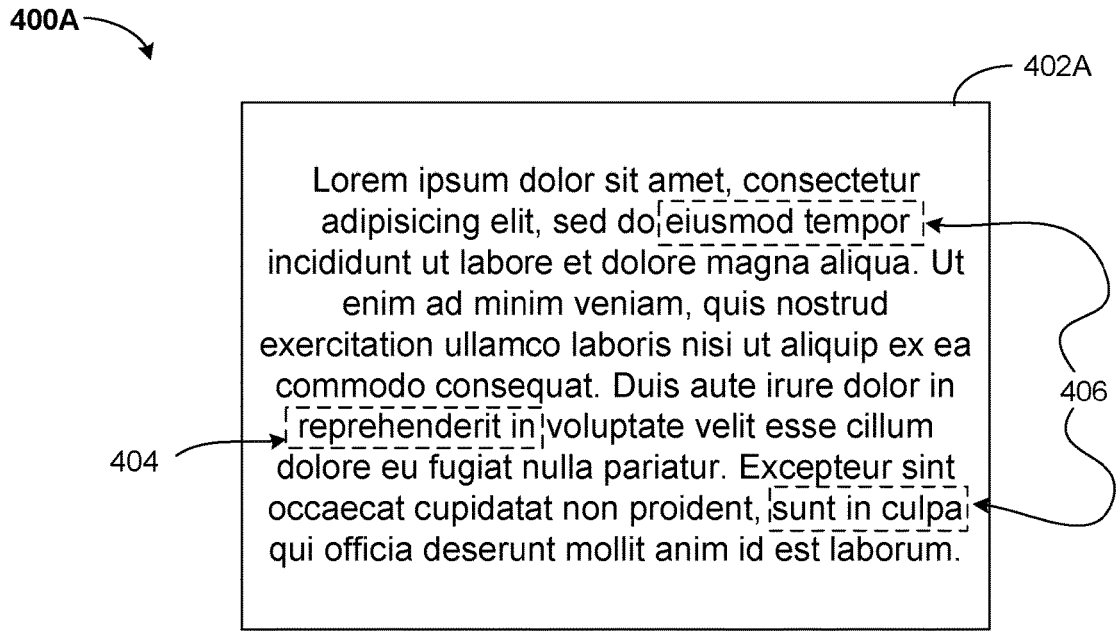
FIG. 4A shows exemplary content having sensitive information that is displayed on the mobile device screen when an authorized user is viewing the screen, according to one embodiment.

FIG. 4A shows an exemplary view 400A of a mobile device screen displaying sensitive information when an authorized user is viewing the screen, according to one embodiment. Accordingly, the exemplary optical arrangement depicted in FIG. 3A may be utilized. View 400A may include, among other things, content 402A that may include one or more regions 404 having non-sensitive content and one or more regions 406 that contain sensitive content. In operation, an authorized viewer may be able to read all of the content 402A in view 400A without any portion of content 402A being obscured. For example, both the authorized viewer or user 104 (FIG. 1) and the unauthorized viewer or user 106 (FIG. 1) are able to view both the non-sensitive content within one or more regions 404 and the sensitive content corresponding to one or more regions 406.

Figure 4B:
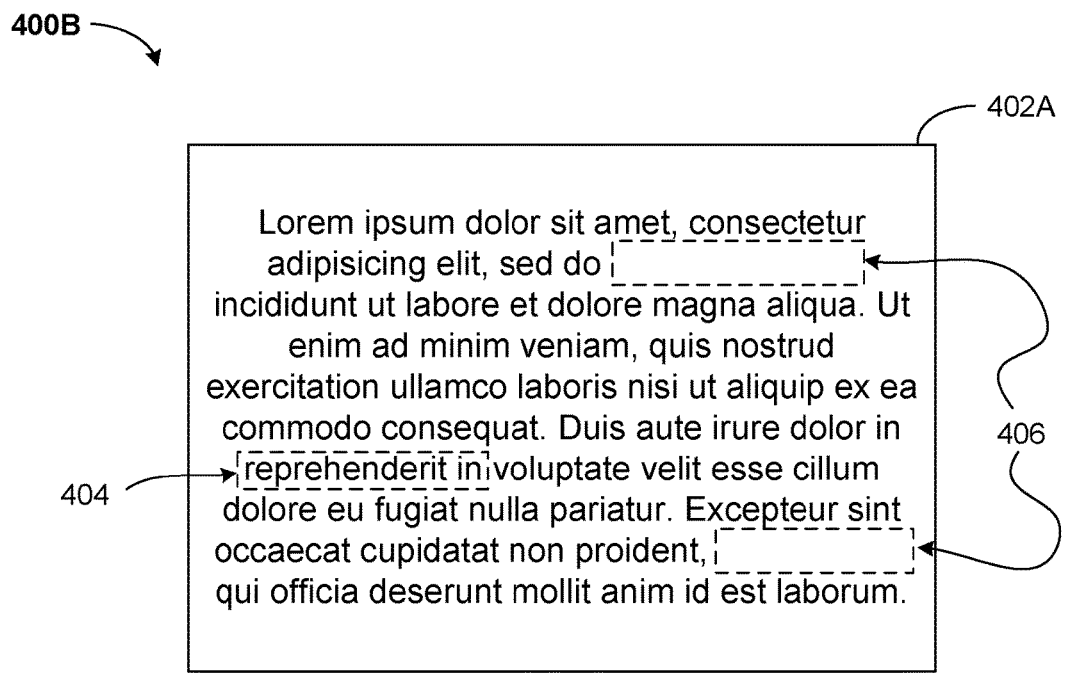
FIG. 4B shows the obscuring of the sensitive information that is displayed on the mobile device screen depicted FIG. 4A, according to one embodiment.

FIG. 4B shows an exemplary view 400B of the obscuring of the sensitive information that is displayed on the mobile device screen depicted FIG. 4A, according to one embodiment. Accordingly, the exemplary optical arrangement depicted in FIG. 3B may be utilized. As with FIG. 4A, View 400B also includes content 402A, which includes one or more regions 404 having non-sensitive content and one or more regions 406 that contain sensitive content. View 400B may be visible to an unauthorized user 106 (FIG. 1) attempting to view the screen from an oblique angle relative to the screen. For example, region 404 containing non-sensitive content may be able to be read without obscurity by the unauthorized user 106, while region 406 having the sensitive content may appear obscured to the unauthorized user 106 in order to prevent the sensitive content from being viewed from, for example, "over the shoulder" of the authorized viewer 104 (FIG. 1). It may be appreciated that, as a preference, all of content 402A may be protected as sensitive content.

Figure 5A:
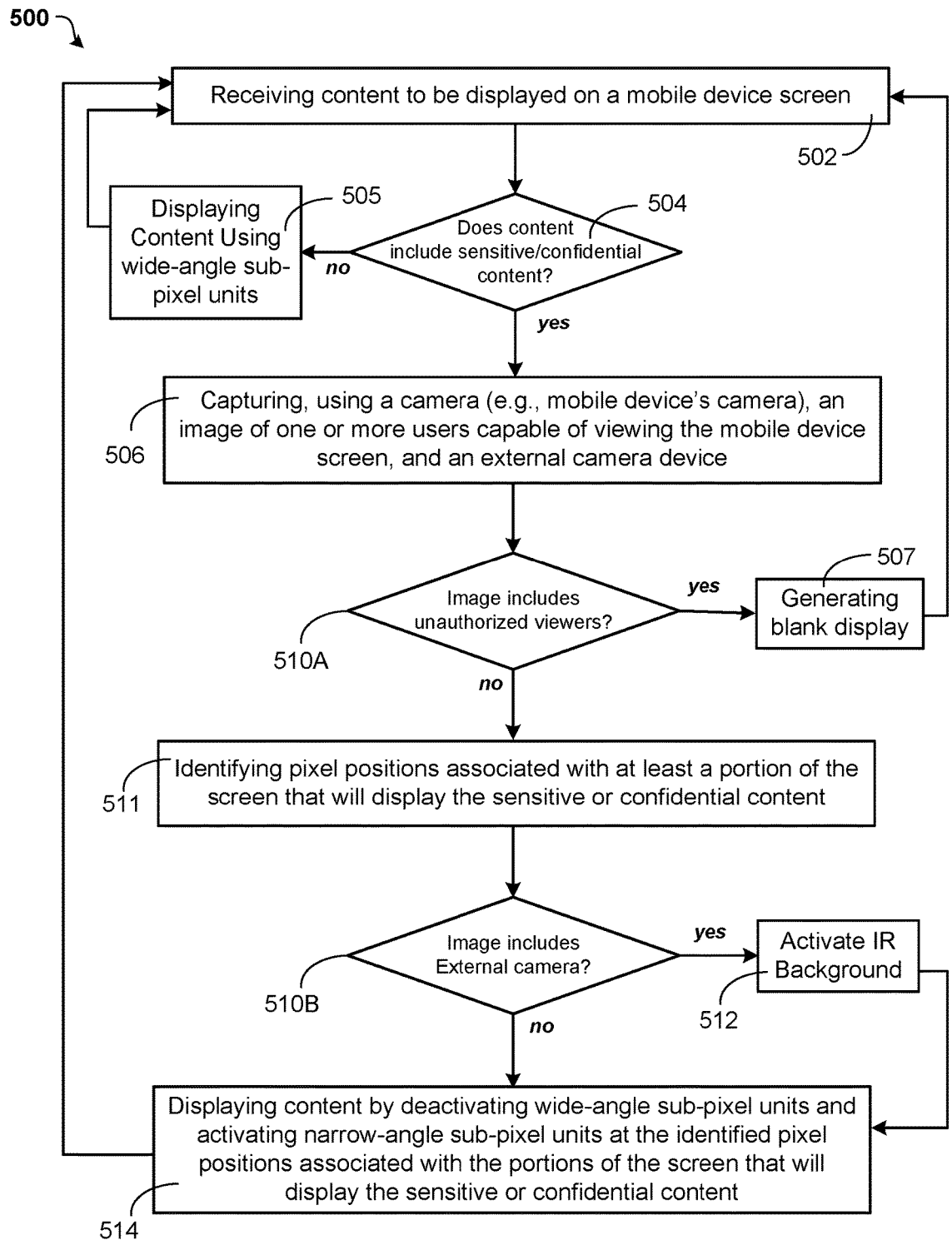
FIG. 5A depicts a flowchart of a process (i.e., a Mobile Device Screen Content-Protection Program: a MDSC program) for protecting confidential or sensitive content from being viewed by an unauthorized user, according to one embodiment.

FIG. 5A depicts an operational flowchart 500 corresponding to a process (i.e., a Mobile Device Screen Content-Protection Program: a MDSC program) for protecting confidential or sensitive content from being viewed by an unauthorized viewer, according to one embodiment. The operational flowchart 500 may be described with the aid of the exemplary embodiments of FIG. 1 and FIG. 2B.

At 502, content to be displayed on a mobile device screen 102 (FIG. 1) is received by the mobile device screen 102 for analysis prior to being displayed. The received content to be displayed on mobile device screen 102 may, however, contain, among other things, sensitive or confidential information to be viewed by only an authorized viewer or user 104 (FIG. 1).

For example, content may be displayed on mobile device screen 102 (FIG. 1) to user 104 (FIG. 1) using sub-pixel units 206A-206C (FIG. 2B), sub-pixel units 204A-204C (FIG. 2B), or a combination of both sub-pixel units 206A-206C and sub-pixel units 204A-204C. As described by the following processes, analysis of the content may ascertain which of sub-pixel units 206A-206C (FIG. 2B) and sub-pixel units 204A-204C (FIG. 2B) are activated based on the content to be displayed on the mobile device screen 102 (FIG. 1) to the user 104 (FIG. 1).

At 504, based on the analysis of the received content (502), a determination is made as to whether the received content contains sensitive or confidential content. For example, mobile device 101 (FIG. 1) may process the received content and determine if this content to be displayed on the mobile device screen 102 (FIG. 1) is directed to sensitive or confidential information. An unauthorized user 106 (FIG. 1) may attempt to view content containing sensitive or confidential content on mobile device screen 102. Prior to displaying this content, mobile device 101 may determine whether sensitive content is going to be displayed on the mobile device screen 102. If, however, it is determined (504) that no sensitive or confidential information is present in the received content, at 505, the mobile device 101 will continue to display the non-sensitive or non-confidential information on the mobile device screen 102, while receiving more content for display and analysis (502, 504). For example, at 505, based on a determination that the received content does not contain sensitive or confidential content (504), the received content is displayed on the mobile device screen 102 (FIG. 1) using the wide angle sub-pixel units 204A-204C (FIG. 2B). Thus, a wide-angle viewing mode is employed since there is no detected sensitive or confidential content to be displayed.

At 506, based on a determination that the received content does contain sensitive or confidential content (504), an image of one or more users capable of viewing the mobile device screen is captured using a camera. In operation, a camera 103 (FIG. 1) embedded within mobile device 101 (FIG. 1) may capture an image of one or more users such as authorized user 104 (FIG. 1) and unauthorized user 106 (FIG. 1) that are capable of viewing the mobile device screen 102 (FIG. 1). The captured image may be used, among other things, to determine whether the user attempting to view the content displayed on mobile device screen 102 is authorized to view the sensitive or confidential content.

At 510A, it is first determined whether the captured image (506) includes an image of one or more unauthorized users. In operation, mobile device camera 103 (FIG. 1) may capture images of one or more users viewing the screen. The captured images are then compared to one or more reference images to categorize users as an authorized user 104 (FIG. 1) or an unauthorized user 106 (FIG. 1).

If at 510A it is determined that the captured image (506) does not include one or more unauthorized users 106 (FIG. 1), then at 511, based on the detection of sensitive content (504), one or more pixel positions associated with at least a portion of the mobile device screen that will display the sensitive or confidential content are determined. In operation, mobile device 101 (FIG. 1) may determine a plurality of one or more pixels from among the plurality of pixels 201B (FIG. 2B) that will display the sensitive content. The one or more pixel positions displaying the sensitive or confidential content may then require protection from an attempt to be viewed by an unauthorized user 106 (FIG. 1).

In some implementations, the determination of sensitive content or information (504) may be accomplished using various criteria such as, but not limited to, keywords, symbols, or phrases. For example, the symbol "$" may determine that financial information is being displayed. Thus, any numerical information following the "$" may signify pixels positions that require obfuscation and protection from unauthorized eyes. In other implementations, the determination of sensitive content or information (504) may be carried out by an authorized user. For example, the authorized user 104 (FIG. 1) may select confidential portions of information displayed on a screen. Once selected, the authorized user 104 (FIG. 1) can subsequently tag the selected portions of information as being sensitive or confidential content. Any subsequent processing of the tagged information will then provide an indication that the information is directed to sensitive or confidential content. Certain other parameters within the mobile device 101 (FIG. 1) may also trigger a determination of sensitive or confidential content (504). For example, if the mobile device 101 (FIG. 1) is set to airplane mode (i.e., a flight safe mode that disables radio frequency communications on the mobile device), all displayed content is defaulted as sensitive or confidential. This determination is based on an assumption that the authorized user 104 (FIG. 1) is seated on an aircraft in close proximity to a fellow passenger. Thus, all displayed content is protected from being viewed by adjacent passengers.

If at 510A it is determined that the captured image (506) does include one or more unauthorized users 106 (FIG. 1), then at 507, a blank or other predefined non-sensitive content display is generated. For example, a blank display may include an entirely black or uniform colored display screen (e.g., all white screen). Alternatively, the screen may display a banner warning the user that the display 102 (FIG. 1) of the mobile device 101 (FIG. 1) is in view of an unauthorized user 106. The warning may provide further instructions to the user for enabling the display of the image including the sensitive content. The process may also return to 502, whereby the same received content may be reprocessed through 504, 506, and 510A.

As previously described, once sensitive content is detected (504) and the captured image (506) does not include one or more unauthorized users (510A), at 511 one or more pixel positions associated with at least a portion of the mobile device screen that will display the sensitive or confidential content are determined. Subsequently, at 510B it is determined whether an external camera device or plural devices image is detected within the field of view of the mobile device camera or plural cameras. For example, the presence of an image of external camera 109 (FIG. 1) within the field of view of the camera 103 (FIG. 1) of mobile device 101 (FIG. 1) is determined.

If at 510B, an external camera device image is detected within the field of view of the mobile device camera, at 512 IR sub-pixel units associated with the mobile device display screen are activated. As previously described, each of the pixels 202B (FIG. 2B) of the mobile device screen 102 (FIG. 1) may include one or more IR sub-pixel units 208 (FIG. 2B). Thus, if at 510B an image of, for example, external camera device 109 (FIG. 1) is detected within the field of view of the mobile device camera 103 (FIG. 1), the mobile device 101 (FIG. 1) activates the one or more IR sub-pixel units 208 at the identified pixel positions corresponding to the sensitive or confidential content (511).

Once the IR sub-pixel units generate an IR background (512), at 514 the received content (502) is displayed by deactivating the wide-angle sub-pixel units at the identified pixel positions associated with the portions of the screen that will display the sensitive or confidential content and activating the narrow-angle sub-pixel units at the identified pixel positions associated with the portions of the screen that will display the sensitive or confidential content. For example, the mobile device 101 (FIG. 1) may deactivate wide-angle sub-pixel units 204A-C (FIG. 2B) and activate narrow-angle sub-pixel units 206A-C (FIG. 2B) in order to decrease the viewing angle of the mobile device screen 102 (FIG. 1) at the pixel positions of the sensitive or confidential content (514). Thus, by narrowing the field of view based on activating narrow-angle sub-pixel units 206A-C (FIG. 2B), the sensitive content at the pixel positions of narrow-angle sub-pixel units 206A-C (FIG. 2B) appear obfuscated (e.g., dark and unreadable) to the one or more unauthorized users 106 (FIG. 1) attempting to view the mobile device screen 102.

With respect to the activated IR background (512), by overlapping the output of the narrow angle sub-pixel units 206A-C (FIG. 2B) located at the pixel positions of the sensitive or confidential content, the image sensor of the external camera device 109 (FIG. 1) is saturated and cannot image the sensitive or confidential content. Thus, the authorized users are unable to reproduce an image of the displayed sensitive or confidential content using an external image capture device (e.g., a camera). In some implementations, all of the IR sub-pixel units 208 (FIG. 2B) within the plurality of pixels 201B (FIG. 2B) may be activated (i.e., battery capacity permitting) for enhancing the saturation capability. The IR light intensity from the IR sub-pixel units 208 (FIG. 2B) may be chosen to be at least a hundred times (×100) larger than the photon flux emitted by the visible sub-pixel units 204A-204B, 206A-206B (FIG. 2B).

Optionally, the activated narrow-angle sub-pixel units 206A-C (FIG. 2B) may obfuscate the sensitive or confidential content for a predetermined period of time (e.g., 5 minutes). After expiry of this predetermined period of time, the pixel positions corresponding to the activated narrow-angle sub-pixel units 206A-C (FIG. 2B) are deactivated, while the adjacent wider-angle sub-pixel units 204A-C (FIG. 2B) at the same pixel positions are activated. In this implementation, content protection may occur over as predefined period of time. The pre-defined period of time may increase as the confidentiality or sensitivity (e.g., medical records) of the content elevates. Also, according to an alternative implementation, an increased portion (e.g., 50%) of the mobile device screen 102 (FIG. 1) may be obfuscated by activating a larger number of narrow-angle sub-pixel units 206A-C (FIG. 2B) at different locations on the screen. More specifically, in addition to activating the narrow-angle sub-pixel units 206A-C (FIG. 2B) for obfuscating the sensitive or confidential content, additional narrow-angle sub-pixel units 206A-C (FIG. 2B) are activated at other regions or portions of the mobile device screen 102 (FIG. 1).

If at 510B an external camera device image is not detected within the field of view of the mobile device camera, without IR background activation, at 514 the received content (502) is displayed by deactivating the wide-angle sub-pixel units at the identified pixel positions associated with the portions of the screen that will display the sensitive or confidential content and activating the narrow-angle sub-pixel units at the identified pixel positions associated with the portions of the screen that will display the sensitive or confidential content. For example, the mobile device 101 (FIG. 1) may deactivate wide-angle sub-pixel units 204A-C (FIG. 2B) and activate narrow-angle sub-pixel units 206A-C (FIG. 2B) in order to decrease the viewing angle of the mobile device screen 102 (FIG. 1) at the pixel positions of the sensitive or confidential content (514). Thus, by narrowing the field of view based on activating narrow-angle sub-pixel units 206A-C (FIG. 2B), the sensitive content at the pixel positions of narrow-angle sub-pixel units 206A-C (FIG. 2B) appear obfuscated (e.g., dark and unreadable) to the one or more unauthorized users 106 (FIG. 1) attempting to view the screen 102.

In order to display the content, the one or more authorized users 104 (FIG. 1) may be required to fill a certain portion of the captured image area or the mobile device camera's 103 (FIG. 1) field of view. For example, a certain portion (e.g., >70%) of the screen's 102 (FIG. 1) pixels corresponding to the captured image area may be required to be occupied by the image of each user captured by the camera 103. This process, among other things, increases the precision in the user detection process (i.e., authorized or unauthorized user) in subsequent processes and mitigates the probability of another user (i.e., authorized or unauthorized user) being able to view the display screen 102 without actually appearing in the image captured by the mobile device camera 103. In some implementations, a single user may be required to fill a certain portion of the viewing screen of the mobile device camera 103 (FIG. 1). In other implementations, two or more users up to a predetermined limit (e.g., 3 users) may be required to fill a certain portion of the viewing screen of the mobile device camera 103 (FIG. 1) during the authorized viewer detection process.

Figure 5B:
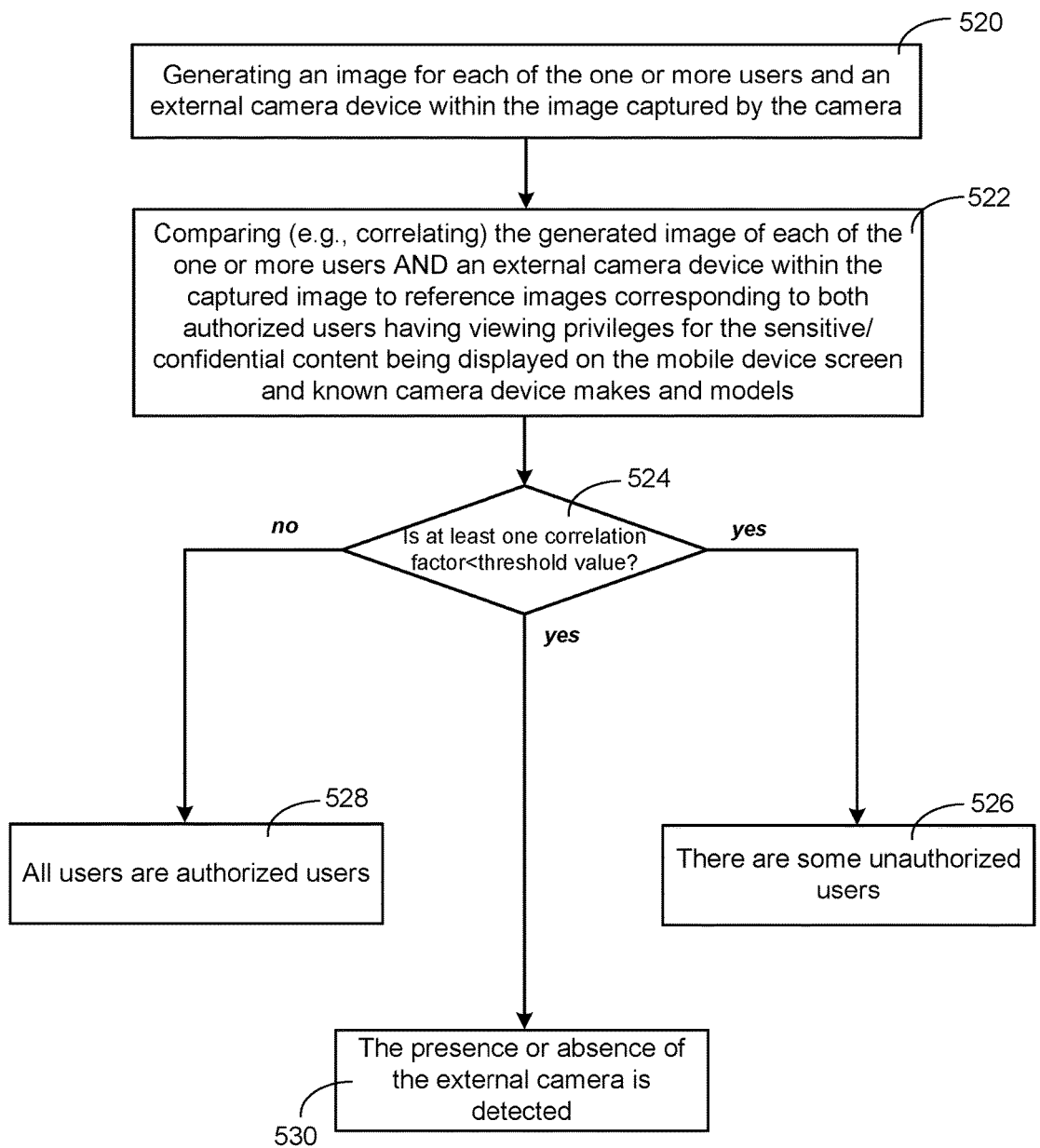
FIG. 5B depicts a flowchart of a process for determining one or more unauthorized users and/or external camera devices within the process of FIG. 5A, according to one embodiment.

Process 500 (FIG. 5A) thus provides a closed loop adaptive directional mobile device screen permitting limited viewing at a specified cone of viewing based on detecting sensitive or confidential content. The sub-pixels units of the mobile device screen each include one or more IR emitters that saturate the image sensors of external cameras that may be used to capture an image of the mobile device screen, whereby the presence of the external camera and one or more unauthorized users is detected by an embedded camera within the mobile device. Moreover, beam steering optics within the mobile device screen and image recognition techniques for detecting authorized users may be utilized to continuously steer the displayed output from the mobile device screen toward the authorized user along a generated narrower cone of viewing. As depicted in FIGS. 5A and 5B, the closed loop process of detecting authorized users/external-cameras, activating countermeasures based on the detected external cameras, generating a narrower viewing cone using the narrow-angle sub-pixel units 206A-206B for sensitive or confidential content, and steering the narrower viewing cone of the screen to an authorized user is accomplished by processes 502-530. The processing steps of FIGS. 5A and 5B may be carried out by one or more processing units within mobile device 101 (FIG. 1). An exemplary embodiment of the one or more processing units within mobile device 101 (FIG. 1) are illustrated and described in relation to the one or more processors 820 of FIG. 6.

FIG. 5B depicts a flowchart of processes 510A and 510B for determining one or more unauthorized viewers and/or external camera devices within the process of FIG. 5A, according to an embodiment. FIG. 5B may be described with the aid of the exemplary embodiment of FIG. 1.

At 520, an image is generated for each of the one or more users and external image capture devices (e.g., an external camera) within the image captured by the camera. In operation, mobile device 101 (FIG. 1) may utilize camera 103 (FIG. 1) in order to generate images of one or more authorized users 104 (FIG. 1) and one or more unauthorized users 106 (FIG. 1) within the captured image 506 (FIG. 5A). At 520, an image of an external camera device 109 (FIG. 1) may also be generated, provided the external camera device 109 (FIG. 1) is present within the captured image 506.

At 520, in order to generate the image, the one or more users may be required to fill a certain portion of the captured image area or the mobile device camera's 103 (FIG. 1) field of view. For example, a certain portion (e.g., >70%) of the screen's 102 (FIG. 1) pixels corresponding to the captured image area may be required to be occupied by the image of each user captured by the camera 103. This process, among other things, increases the precision in the user detection process (i.e., authorized or unauthorized user) in subsequent processes and mitigates the probability of another user (i.e., authorized or unauthorized user) being able to view the display screen 102 without actually appearing in the image captured by the mobile device camera 103. In some implementations, a single user may be required to fill a certain portion of the viewing screen of the mobile device camera 103 (FIG. 1). In other implementations, two or more users up to a predetermined limit (e.g., 3 users) may be required to fill a certain portion of the viewing screen of the mobile device camera 103 (FIG. 1) during the authorized viewer detection process.

At 522, the generated image of each of the one or more users within the captured image (506) are compared to reference images corresponding to authorized users having viewing privileges for the sensitive or confidential content being displayed on the mobile device screen. Also at 522, the generated image of one or more external camera devices (e.g., external camera device 109: FIG. 1) are compared to reference images corresponding to various camera device make and models. In operation, mobile device 101 (FIG. 1) may compare the images generated from the image captured by camera 103 (FIG. 1) to one or more reference images in order to generate a correlation factor corresponding to the measure of similarity between the generated images (e.g., users and image capture devices) and reference images (e.g., authorized users and different camera devices). It may be appreciated that the one or more references may be stored in any electronic form, such as locally on mobile device 101 or using a cloud-based service that mobile device 101 may access.

At 524, a correlation factor corresponding to the degree of similarity between the generated images and the reference images is compared to a threshold value. In operation, mobile device 101 (FIG. 1) may use the comparison of the images captured by camera 103 (FIG. 1) to the one or more reference images to generate a correlation factor corresponding to the comparison. For example, a correlation factor generated by an image of authorized user 104 (FIG. 1) may have a higher value than a correlation factor generated by an image of unauthorized user 106 (FIG. 1). Similarly, a correlation factor generated by the image of the external camera 109 (FIG. 1) may have a higher value than a correlation factor generated by a captured image of a non-camera device.

At 526, if there is at least one correlation factor associated with the user images that is less than the threshold value, there are some unauthorized users attempting to view the screen. In operation, unauthorized user 106 (FIG. 1) may be within viewing region 108 (FIG. 1) and may attempt to view the content displayed on mobile device screen 102 (FIG. 1). Unauthorized user 106 may subsequently be detected by camera 103 (FIG. 1) and an image may be captured by camera 103 and compared to a reference image by mobile device 101 (FIG. 1). Mobile device 101 may then determine that at least one correlation factor is less than the threshold value and may attempt to protect the sensitive or confidential content.

At 528, if the correlation factor is at, or above, the threshold value, all users are authorized users. In operation, authorized user 104 (FIG. 1) may be the only viewer of the content on mobile device screen 102 (FIG. 1). Mobile device 101 (FIG. 1) may then determine that no correlation factor is less than the threshold value. In an alternative implementation, multiple authorized users may be designated as having viewing privileges associated with the sensitive or confidential content displayed on mobile device screen 102.

At 530, if the correlation factor associated with detecting an external camera device is less than a threshold value designated for an external camera device, then no external camera is detected. Conversely, if the correlation factor associated with detecting the external camera device is at or above the threshold value designated for the external camera device, then the external camera is detected. For example, an image of external camera 109 (FIG. 1) may be captured by camera 103 (FIG. 1) and compared to a reference image of one or more cameras by mobile device 101 (FIG. 1). Mobile device 101 then determines that the correlation factor associated with the comparison is higher than a designated threshold value due to the presence of the camera device 109 (FIG. 1) within the captured image. As such, the mobile device 101 will protect the sensitive or confidential content (e.g., FIGS. 4A and 4B: 406) using the countermeasures facilitated by the IR sub-pixel units 208 (FIG. 2B).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
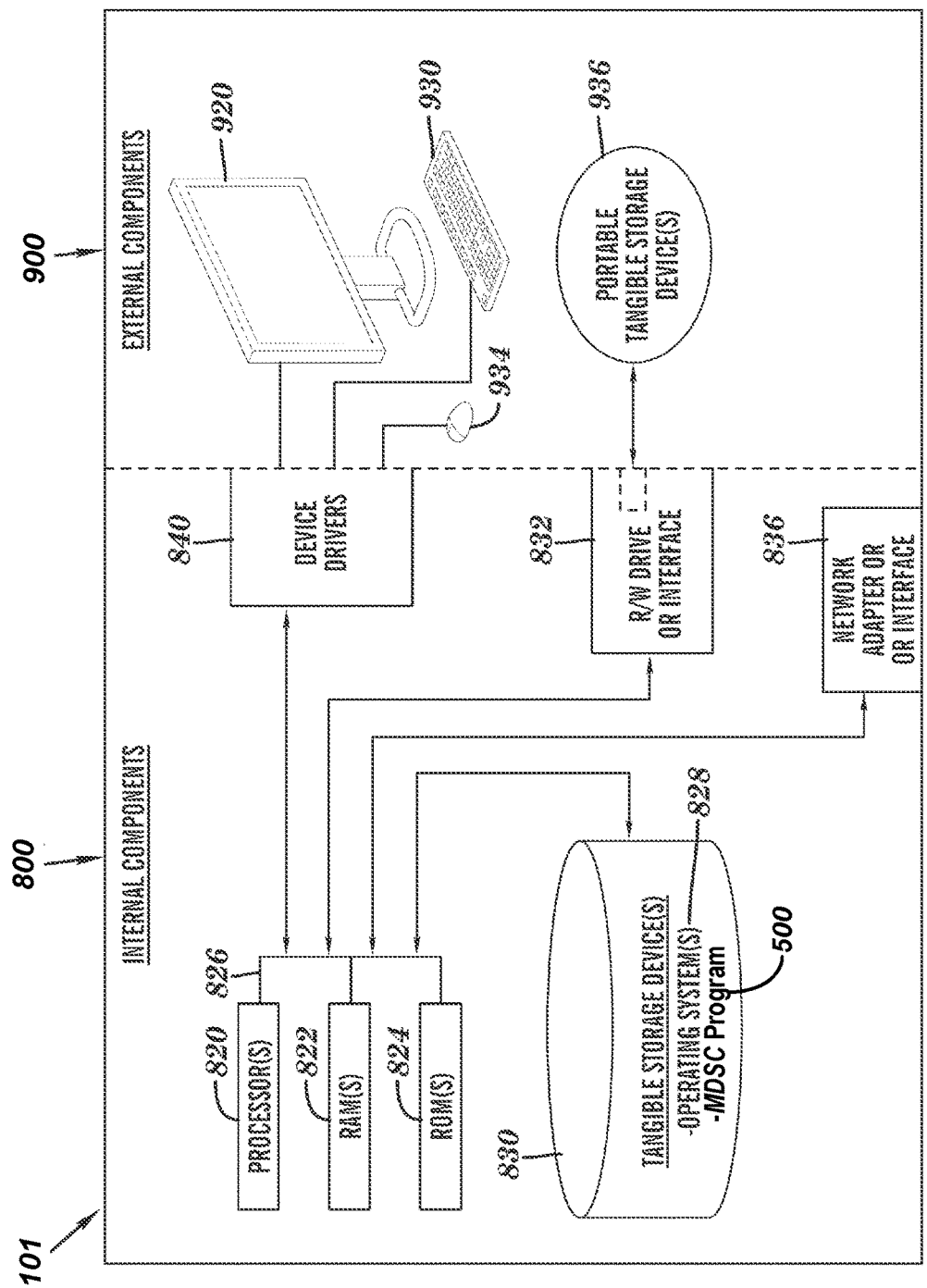
FIG. 6 is a block diagram of hardware and software for executing the process flows of FIGS. 5A-5B within a mobile device, according to one embodiment.

FIG. 6 shows a block diagram of the components of a data processing system 800, 900, that may be incorporated within mobile device 101 (FIG. 1) in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing system 800, 900 may include may include a set of internal components 800 and a set of external components 900 illustrated in FIG. 6. The set of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as Mobile Device Screen Content-Protection (MDSC) Program 500 is stored on one or more computer-readable tangible storage devices 830 for execution by one or more processors 820 via one or more RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

The set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The MDSC program 500 can be stored on one or more of the respective portable computer-readable tangible storage devices 936, read via the respective R/W drive or interface 832 and loaded into the respective hard drive 830.

The set of internal components 800 may also include network adapters (or switch port cards) or interfaces 836 such as a TCP/IP adapter cards, wireless wi-fi interface cards, or 3G or 4G wireless interface cards or other wired or wireless communication links. MDSC program 500 can be downloaded from an external computer (e.g., server) via a network (for example, the Internet, a local area network or other, wide area network) and respective network adapters or interfaces 836. From the network adapters (or switch port adaptors) or interfaces 836, the MDSC program 500 is loaded into the respective hard drive 830. The network may comprise copper wires, optical fibers, wireless transmission, routers, firewalls, switches, gateway computers and/or edge servers.

The set of external components 900 can include a computer display monitor 920, a keyboard 930, and a computer mouse 934. External component 900 can also include touch screens, virtual keyboards, touch pads, pointing devices, and other human interface devices. The set of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

As depicted in FIG. 6, the one or more processors 820 (i.e., one or more processing units) may be located within the mobile device 101 (FIG. 1) for executing the processes of FIGS. 5A and 5B, while the external display monitor 920 coupled to the one or more processors 820 may include the integrated mobile device screen 102 (FIG. 1) having the adaptive directional display capabilities corresponding to FIG. 2B. The one or more processors 820 may include a single processor device that operates the mobile device 101 (FIG. 1), executes the MDSC program 500, and drives mobile device screen 102 (FIG. 1). The one or more processors 820 may alternatively include multiple processors, whereby one of the multiple processors provides image processing by, among other things, executing the MDSC program 500, while the other processor carries out processing activities (e.g., camera operation) for the operation of the mobile device 101 (FIG. 1).

The following described embodiments enhance the operation of a generic computer by providing content-based control over the viewing capabilities of a computerized display screen. More specifically, the above-described processes analyze information that is going to be displayed on a mobile device screen in order to modify the display characteristics of the screen based on identifying sensitive or confidential content within the information that is going to be display.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method of protecting content displayed on a mobile device screen, the method comprising:

receiving content to be displayed on the mobile device screen, wherein the received content contains sensitive content and non-sensitive content;

detecting an image of one or more authorized users viewing the mobile device screen;

generating, based on the detected image of the one or more authorized users, an image of the received content on the mobile device screen using a plurality of pixels, the plurality of pixels each having both first sub-pixel units that include a first viewing angle and second sub-pixel units that include a second viewing angle, the first sub-pixel units generating an image of the non-sensitive content on the mobile device screen at the first viewing angle and the second sub-pixel units generating an image of the sensitive content on the mobile device screen at the second viewing angle, wherein the second viewing angle has a smaller viewing angle relative to the first viewing angle for obscuring the sensitive content;

detecting an image of an external camera device used to capture the image of the received content displayed on the mobile device screen;

generating an infrared (IR) signal based on both detecting the image of the external camera device and determining that the detected image of the one or more authorized users only includes the one or more authorized users; and saturating, using the generated IR signal, an image sensor of the external camera device used to capture the image displayed on the mobile device screen.

2. The method of claim 1, wherein a flux of photons corresponding to the one or more infrared light emitting diodes that emit the infrared (IR) light is about one hundred times larger than a flux of photons corresponding to visible light from the first sub-pixel units.

3. The method of claim 1, wherein the second viewing angle includes a diverted optical output from the activated second sub-pixel units towards an authorized viewer of the sensitive content, and wherein the first viewing angle includes a non-diverted optical output from the activated first sub-pixel units, wherein the diverted optical output from the activated second sub-pixel units towards the authorized viewer of the sensitive content is generated based on a facial recognition technique identifying the position of the authorized viewer relative to the mobile device screen.

4. The method of claim 1, wherein the infrared signal is generated by one or more infrared light emitting diodes located adjacent each of the plurality of pixels having both the first sub-pixel units and the second sub-pixel units.

5. The method of claim 4, wherein the infrared signal generated by the one or more infrared light emitting diodes overlap visible light from the second sub-pixel units associated with the generated image of the sensitive content on the mobile device screen.

6. A method of protecting content displayed on a mobile device screen, the method comprising:

receiving content to be displayed on the mobile device screen, wherein the received content contains sensitive content and non-sensitive content;

capturing, using a camera, an image of one or more users viewing the mobile device screen in response to the received content containing sensitive content;

correlating the captured image to one or more reference images associated with authorized users;

determining a correlation factor based on the comparing of the captured image to the one or more reference images;

detecting the user viewing the mobile device screen as an authorized user based on the correlation factor being greater than a reference correlation factor;

generating, based on the detected image of the one or more authorized users, an image of the received content on the mobile device screen using a plurality of pixels, the plurality of pixels each having both first sub-pixel units that include a first viewing angle and second sub-pixel units that include a second viewing angle, the first sub-pixel units generating an image of the non-sensitive content on the mobile device screen at the first viewing angle and the second sub-pixel units generating an image of the sensitive content on the mobile device screen at the second viewing angle, wherein the second viewing angle has a smaller viewing angle relative to the first viewing angle for obscuring the sensitive content;

detecting an image of an external camera device used to capture the image of the received content displayed on the mobile device screen;

generating an infrared (IR) signal based on both detecting the image of the external camera device and determining that the detected image of the one or more authorized users only includes the one or more authorized users; and saturating, using the generated IR signal, an image sensor of the external camera device used to capture the image displayed on the mobile device screen.

7. The method of claim 6, wherein a flux of photons corresponding to the one or more infrared light emitting diodes that emit the infrared (IR) light is about one hundred times larger than a flux of photons corresponding to visible light from the first sub-pixel units.

8. The method of claim 6, further comprising:

detecting one or more users viewing the mobile device screen as unauthorized users based on the correlation factor being less than a reference correlation factor; and generating, based on the detected one or more unauthorized users, a blank image on the mobile device screen.

9. The method of claim 6, wherein the second viewing angle includes a diverted optical output from the activated second sub-pixel units towards an authorized viewer of the sensitive content, and wherein the first viewing angle includes a non-diverted optical output from the activated first sub-pixel units, wherein the diverted optical output from the activated second sub-pixel units towards the authorized viewer of the sensitive content is generated based on a facial recognition technique identifying the position of the authorized viewer relative to the mobile device screen.

10. The method of claim 6, wherein the infrared signal is generated by one or more infrared light emitting diodes located adjacent each of the plurality of pixels having both the first sub-pixel units and the second sub-pixel units.

11. The method of claim 10, wherein the infrared signal generated by the one or more infrared light emitting diodes overlap visible light from the second sub-pixel units associated with the generated image of the sensitive content on the mobile device screen.

12. A method of protecting content displayed on a mobile device screen, the method comprising:

receiving content to be displayed on the mobile device screen, wherein the received content contains sensitive content and non-sensitive content;

detecting an image of one or more authorized users viewing the mobile device screen;

generating, based on the detected image of the one or more authorized users, an image of the received content on the mobile device screen using a plurality of pixels, the plurality of pixels each having both first sub-pixel units that include a first viewing angle and second sub-pixel units that include a second viewing angle, the first sub-pixel units generating an image of the non-sensitive content on the mobile device screen at the first viewing angle and the second sub-pixel units generating an image of the sensitive content on the mobile device screen at the second viewing angle, wherein the second viewing angle has a smaller viewing angle relative to the first viewing angle for obscuring the sensitive content;

detecting an image of one or more unauthorized users viewing the mobile device screen;

generating, based on the detected one or more unauthorized users, a blank image on the mobile device screen;

detecting an image of an external camera device used to capture the image of the received content displayed on the mobile device screen;

generating an infrared (IR) signal based on both detecting the image of the external camera device and determining that the detected image of the one or more authorized users only includes the one or more authorized users; and saturating, using the generated IR signal, an image sensor of the external camera device used to capture the image displayed on the mobile device screen.

13. The method of claim 12, wherein a flux of photons corresponding to the one or more infrared light emitting diodes that emit the infrared (IR) light is about one hundred times larger than a flux of photons corresponding to visible light from the first sub-pixel units.

14. The method of claim 12, wherein the second viewing angle includes a diverted optical output from the activated second sub-pixel units towards an authorized viewer of the sensitive content, and wherein the first viewing angle includes a non-diverted optical output from the activated first sub-pixel units, wherein the diverted optical output from the activated second sub-pixel units towards the authorized viewer of the sensitive content is generated based on a facial recognition technique identifying the position of the authorized viewer relative to the mobile device screen.

15. The method of claim 12, wherein the infrared signal is generated by one or more infrared light emitting diodes located adjacent each of the plurality of pixels having both the first sub-pixel units and the second sub-pixel units.

16. The method of claim 15, wherein the infrared signal generated by the one or more infrared light emitting diodes overlap visible light from the second sub-pixel units associated with the generated image of the sensitive content on the mobile device screen.

17. The method of claim 12, wherein the infrared signal is generated by one or more third sub-pixel units of each of the plurality of pixels.

* * * * *